TRICOLOR TELEVISION PICTURE TUBE
Filed Nov. 7, 1951
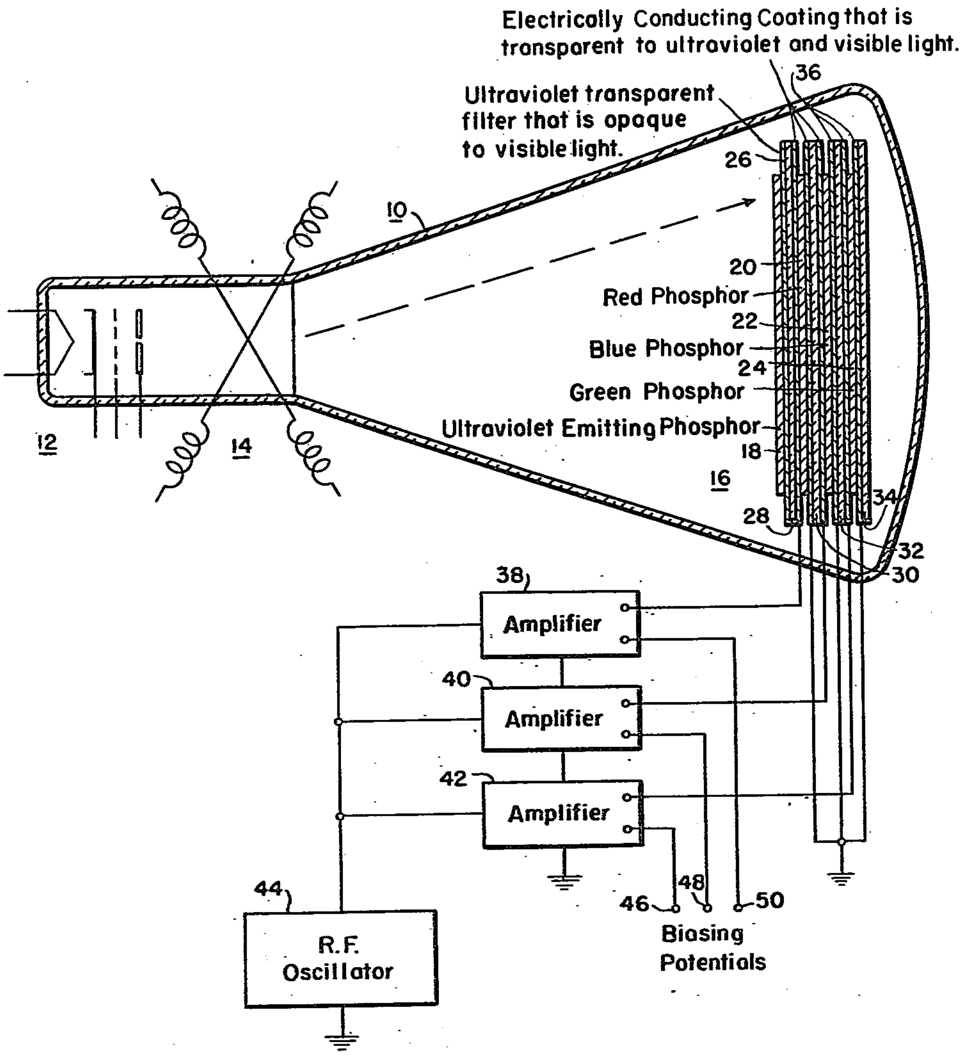
WITNESSES:
E. A. McCloskey
K. G. Brodrick
INVENTORS
Kenneth N. Fromm
and Theadore Miller.
BY
F. E. Browder
ATTORNEY United States Patent Office 2,795,730

Patented June 11, 1957

2,795,730

TRICOLOR TELEVISION PICTURE TUBE

Kenneth N. Fromm, Columbus, Ohio, and Theadore Miller, Pittsburgh, Pa., assignors to Westinghouse Electric Corporation, East Pittsburgh, Pa., a corporation of Pennsylvania Application November 7, 1951, Serial No. 255,208

12 Claims. (Cl. 315—21)

Our invention relates to a luminescent screen such as a screen in a cathode-ray tube, and more particularly to a screen of this type which is suitable for presentation of colored television pictures. Our invention hereinafter described is related to an invention of Mr. Theadore Miller entitled "Controlling the Luminosity of a Phosphor Screen," Serial No. 243,487, filed August 24, 1951, and assigned to the same assignee.

It is an object of our invention to provide a single tube for presenting a television picture in its natural colors.

It is another object of our invention to provide a simplified structure, for particularly the screen of a cathode-ray tube, to be used as a color television presentation medium.

It is a further object of our invention to provide an arrangement of the component elements of a screen for a color television tube, such that it is not necessary to bend the electron beam which is employed to excite those screen elements nor is a servo-system required for maintaining the proper registering position of the electron beam, and further, it is unnecessary to provide beam restricting mask structures in conjunction with the luminescent elements of the screen.

It is an additional object of my invention to provide a screen structure for a color television tube which is easily manufactured and is satisfactorily operable with particularly high speed color commutation.

It is a still additional object of our invention to provide a screen for a color television picture tube, said screen presenting no resolution problems respecting the physical arrangements of the phosphors or like elements used in the screen.

It is a still further object of our invention to provide a color television screen for use in a color television picture tube such that no alignment problems are presented between the beam deflecting means and the tube screen itself.

It is a different object of our invention to provide a color television picture tube having a screen such that color switching between the component colors of the received picture may be accomplished independently of the electron beam source.

It is a still different object of our invention to provide a screen for a color television picture tube, said screen being characterized by being able to luminesce in a variety of selective colors, the latter color selection being controllable independently of the source of excitation for said screen.

In accordance with our invention, a color television picture tube is provided having a screen made up of a plurality of phosphor or like material layers which are excitable by ultraviolet radiations. A source of an electron beam is provided, and between the electron beam source and the above-mentioned plurality of phosphor layers, there is provided a phosphor or like material layer which emits ultraviolet radiations in response to excitation by an electron beam. Accordingly, the electron beam from its source first strikes the ultraviolet radiation emitting phosphor layer, and the ultraviolet radiations from this layer thereafter excite the plurality of phosphor layers, which are excitable to produce respectively red, green and blue visible light. An ultraviolet transparent filter is provided between the ultraviolet emitting phosphor layer and the other phosphor layers, said filter being substantially opaque to any visible light that may be present in the emission spectrum of the ultraviolet emitting phosphor layer and further being substantially opaque to the electrons from the electron beam. Between the respective pairs of phosphor layers, other than the ultraviolet emitting phosphor layer, there is provided an ultraviolet transparent layer of material, the latter material having on its respective sides, a coating of electrically conducting ultraviolet transparent material. Connected to the latter conductive layers, by the respective pairs thereof, which surround the respective colored light emitting phosphor layers, is a source of high frequency voltage, which source may include a high frequency amplifier of the electronic type such that an electric field is applied across each of the respective colored light emitting phosphor layers. The application of the latter high frequency field is controlled to effect quenching of the output luminescence of the colored light emitting phosphor layers, in accordance with the teachings of the above-cited patent application of Theadore Miller. In this manner, color commutation between the desired output colors for the televised picture may be obtained by quenching the luminescence of the colored light emitting phosphors in accordance with the color synchronizing signals transmitted in conjunction with the video signals of the televised picture.

The novel features that we consider characteristic of our invention are set forth with particularity in the appended claims. The invention itself, however, both as to its organization and its method of operation together with additional objects and advantages thereof will best be understood from the following description of specific embodiments, when read in connection with the accompanying drawing, the figure of which shows a color television picture tube having a screen and associated control circuit in accordance with our invention.

In the drawing, there is shown a color television picture tube 10 of the cathode-ray type having an electron gun 12 and a beam deflection system 14. A screen 16 is provided in the end of the picture tube 10 opposite the electron gun, and in position to be excited by the electron beam from said electron gun 12. The screen 16 comprises a plurality of layers of phosphor or like material, and includes an ultraviolet emitting phosphor layer 18, which is positioned to be directly excited by the electron beam from the electron gun 12, a red phosphor layer 20 which emits red light, a blue phosphor layer 22 which emits blue light, and a green phosphor layer 24 which emits green light. A filter 26 is provided between the ultraviolet emitting phosphor layer 18 and the colored light emitting phosphor layers 20, 22 and 24. This filter 26 is substantially transparent to ultraviolet radiations, but is substantially opaque to visible light and electrons from the electron beam of the electron gun 12. A plurality of thin glass or plastic sheets 28, 30, 32 and 34 are respectively positioned between the various phosphor layers, and on the side of the last phosphor layer 24 which is furthest away from the electron gun 12. The glass sheet 28 is coated on one of its sides by an electrical coating 36, made of NESA glass or like material which is electrically conducting and substantially transparent to ultraviolet and visible light radiations. The glass member 28 is positioned between the filter 26 and the red phosphor layer 20 which emits the red colored light. The side of the glass layer 28 which is adjacent the filter 26 is not covered with the electrically conducting NESA glass coating. The glass layer 30 has an electrically conductive NESA glass or like coating 36 on each of its sides, and is positioned between the red phosphor layer 20 and the blue phosphor layer 22. The glass layer 32 has an electrically conducting NESA glass coating on each of its sides and is positioned between the blue phosphor layer 22 and the green phosphor layer 24. The glass layer 34 has a NESA glass or like material coating on its side which is adjacent the green phosphor layer 24. The electrically conductive coatings on one side of each of the glass plates 30, 32 and 34 are connected to ground potential. The electrically conductive coatings on the opposite side of glass layers 30 and 32 and the electrically conductive coating on glass layer 28 are connected through respectively high frequency amplifiers 38, 40 and 42 such that the latter conductive coatings may be energized from these amplifiers. A high frequency oscillator 44 is connected to each of the amplifiers 38, 40 and 42. Each of the amplifiers 38, 40 and 42 may utilize dual control grid tubes, such as the tube type 6L7, so the output potential of each of these amplifiers can be determined both by the high frequency voltage obtained from the high frequency oscillator 44 and also by a separate biasing potential which is applied to the second of the control grids. The latter biasing potentials are applied through provided terminals 46, 48 and 50, and may be respectively controlled by the color synchronizing signals transmitted in conjunction with the video signals of the color picture to be reproduced by the color television picture tube 10.

In the operation of the color television picture tube 10 in accordance with our invention, the ultraviolet emitting phosphor or like material layer 18 is excited by the electron beam. This latter phosphor layer, in turn, emits ultraviolet radiations in proportion to the current density of the scanning electron beam. The filter 26 is substantially opaque to any visible light that may be present in the emission spectrum of the ultraviolet emitting phosphor 18, and further is opaque to any electrons from the electron beam. This filter 26, however, is substantially transparent to the ultraviolet radiations from the phosphor layer 18. These ultraviolet radiations, in turn, excite the red phosphor layer 20, blue phosphor layer 22 and green phosphor layer 24, such that the latter phosphor layers become luminescent under the influence of the ultraviolet energy emitted by the phosphor layer 18. The members 28, 30, and 32 comprise relatively thin glass or plastic sheets which are transparent to the ultraviolet radiations. Both sides of the sheets are coated with an electrically conductive coating such as NESA glass which, in turn, is substantially transparent to both ultraviolet radiations and visible light. The manufacture of such glass sheets and conductive coating surface films is believed to be well known to those skilled in the art.

The blue phosphor layer 22 and the green phosphor layer 24 are relatively thin such that they are reasonably transparent to the colored light which is emitted by, respectively, the red phosphor layer 20 and the blue phosphor layer 22. In actual practice, phosphor layers such as those employed in accordance with our invention can be obtained which will exhibit a light absorption loss of 50% or less for the light emitted by the red phosphor layer 20. These phosphor layers are semi-transparent to the ultraviolet radiations emitted by the phosphor layer 18, such that each of the colored light emitting phosphor layers 20, 22 and 24 may be excited by those ultraviolet radiations.

In accordance with the teachings of Theadore Miller in the above-referred to patent application, by applying high frequency (including radio frequency) potentials of the proper magnitude to the electrically conductive coatings of the glass sheets 28, 30, 32 and 34, the colored light output or luminescence of the phosphor layers 20, 22 and 24 may be selectively quenched or decreased. Thus, for example, if a radio frequency field is applied between glass plates 28 and 30 and also between the glass plates 30 and 32, the luminosity of the red and blue phosphor layers 20 and 22 will be quenched, and only a green image will appear on the face of the picture tube 10 as the electron beam scans the ultraviolet emitting phosphor layer 18. By properly commutating the radio frequency potentials applied to the respective glass plates 28, 30, 32 and 34, a red, blue, green, or any combination thereof, colored image can be made to appear on the screen as seen by an observer.

In the accomplishment of color commutation between the colored light outputs from the phosphor layers 20, 22 and 24, color synchronizing signals as received by the television receiver apparatus (not shown in the drawing) may be applied to the respective terminals 46, 48 and 50. These terminals are connected to the respective amplifiers 38, 40 and 42 such that the output potentials of the latter amplifiers are determined in part by biasing potentials in accordance with the color synchronizing signals as received by the television receiver of which the picture tube 10 is a component part. The amplifiers 38, 40 and 42 in accordance with one modification of our invention utilize dual control grid tubes such that the output potentials of these amplifiers are also in part controlled by the R. F. potential applied from the radio frequency oscillator 44.

When a red field is to be scanned, the color synchronizing signals will apply through the biasing potential terminals 46, 48 and 50, a negative bias to amplifier 38 thus reducing or cutting off the R. F. quench field which is normally applied across the red colored light emitting phosphor layer 20. If a blue field is to be scanned, the other synchronizing signals will apply a negative bias to amplifier 40 such that the R. F. quenching field applied across the blue phosphor layer 22 is reduced or cut off. For a green field, a negative biasing potential as controlled by the color synchronizing signals is applied to the amplifier 42 such that the R. F. quenching field applied across the green phosphor layer 24 is reduced or cut off. In the absence of any biasing potentials being applied through the terminals 46, 48 and 50, the light output from each of the colored light emitting phosphor layers 20, 22 and 24 will be quenched.

In the event that the red phosphor layer 20 and the blue phosphor layer 22 effectively absorb energy from the ultraviolet radiations, to lower the intensity of excitation for the green phosphor layer 24, this variation of excitation can be compensated for by properly adjusting the gain and biasing potentials of the amplifiers 38, 40 and 42. Similarly, the excitation of the blue phosphor layer 22 may be slightly reduced by the ultraviolet radiation absorption in the red phosphor layer 20.

In this respect instead of completely cutting off the R. F. quenching potential, when, for example, a red field is being scanned, a slight quenching potential can be maintained across the red phosphor layer 20 and in this regard cut down the light output from that phosphor layer. However, it should be noted that the light which is emitted from the phosphor layer that receives the most intensive ultraviolet excitation, namely, the red phosphor layer 20, also is subject to the greatest output light absorption loss through the blue phosphor layer 22 and the green phosphor layer 24. In this manner, compensation for variation of ultraviolet excitation may perhaps be achieved most effectively by properly predetermining the thickness of the colored light emitting phosphor layers 20, 22 and 24.

To minimize loss of output colored light and to minimize loss of the ultraviolet radiation energy, a highly reflecting electron transparent film, such as an aluminum film, can be placed immediately adjacent to the ultraviolet emitting phosphor layer 28, between the latter phosphor layer 18 and the electron gun 12. The use and method of application of such films to phosphor and light emissive layers is believed to be well known to those skilled in the art.

While we have shown and described certain specific embodiments of our invention, many modifications thereof are possible. It is to be understood that for purposes of illustration, the screen shown in the drawing is greatly exaggerated respecting its dimensions. In actual practice, the total thickness of the composite screen would probably be less than .030 of an inch. The screen thickness should be such that optical parallax will cause no noticeable color degradation. Our invention, therefore, is not to be restricted except as is necessitated by the prior art and the spirit of the appended claims.

We claim as our invention:

1. An image display screen comprising a plurality of phosphor layers, each of said phosphor layers being adapted to produce a different one of a plurality of predetermined colors, a pair of conductive electrodes provided for each phosphor layer with said respective phosphor layer sandwiched between said pair of electrodes to provide separate assemblies, a light transparent insulating layer separating said assemblies and means for applying time varying voltages to the respective assemblies.

2. In a cathode-ray tube having an electron beam source, a screen comprising a plurality of ultraviolet excitable layers, each of the last-said layers being adapted for the production of light having one of a plurality of predetermined colors, a layer of electrically conducting material contacting each of the opposite sides of each of said ultraviolet excitable layers, and a layer of ultraviolet emissive material positioned between said source and said ultraviolet excitable layers.

3. The screen of claim 2, in which the layer of ultraviolet emissive material is characterized by being electron excitable.

4. An image display screen comprising a plurality of visible light emissive layers, each of said light emissive layers being adapted to produce a different one of a plurality of predetermined colors, a plurality of pairs of layers of electrical conductive material, one of said phosphor layers being positioned between each of said respective pairs to form separate light emissive layer assemblies, means for insulating said separate light emissive assemblies and means for applying a time varying voltage to each of said assemblies to control the light emission therefrom.

5. A cathode-ray tube for color television purposes having an electron beam source, a plurality of phosphor layers, each of said phosphor layers being adapted to produce a different one of a plurality of predetermined colors, a plurality of pairs of layers of electrically conductive material, one of said phosphor layers being positioned between each of the respective pairs of said conductive layers, and a source of high frequency voltage, said source of high frequency voltage being electrically connected to said layers of electrically conductive material.

6. A cathode-ray tube for color television purposes having a screen comprising a plurality of phosphor layers, each of said phosphor layers being adapted to produce a different one of a plurality of predetermined colors, a plurality of layers of electrically conductive material, one of the last-said layers contacting each of the opposite sides of each of said phosphor layers, a layer of ultraviolet emissive material, said cathode-ray tube having a source of an electron beam, said layer of ultraviolet emissive material being positioned between said source of an electron beam and the plurality of phosphor layers.

7. The apparatus of claim 6, characterized by said layers of electrically conductive material being substantially transparent to ultraviolet radiations.

8. In a cathode-ray tube having an electron beam source, a screen comprising a plurality of ultraviolet excitable layers, each of said ultraviolet excitable layers being adapted for the production of light having one of a plurality of predetermined colors, a layer of electrically conductive material contacting each of the opposite sides of each of said ultraviolet excitable layers, a layer of ultraviolet emissive material positioned between said electron beam source and the plurality of ultraviolet excitable layers, said layer of ultraviolet emissive material being excitable by the electron beam from said electron beam source.

9. In a cathode-ray tube for color television purposes, the combination of an electron beam source, a screen comprising a plurality of phosphor layers, a plurality of pairs of layers of electrically conductive material, one of said phosphor layers being positioned between each of the respective pairs of said conductive layers, each of said phosphor layers being adapted to produce a different one of a plurality of predetermined colors, said cathode-ray tube having an operative tube face, each of said phosphor layers covering an area which is substantially the same as the area of said operative tube face, a source of quenching potential, said source of quenching potential being connected to said layers of conductive material, a layer of ultraviolet emissive material, the last-said layer being positioned between the electron beam source and the plurality of phosphor layers, and a filter member being positioned between the layer of ultraviolet emissive material and the plurality of phosphor layers, said filter material being substantially transparent to ultraviolet radiations and substantially opaque to electrons from the electron beam of said electron beam source and to visible light radiations from said layer of ultraviolet emissive material.

10. A color television display screen comprising a plurality of phosphor layers, each of said phosphor layers being adapted to produce a different one of a plurality of predetermined colors, a plurality of pairs of layers of electrically conductive material, one of the said pairs sandwiching each of said phosphor layers to form separate assemblies, means for insulating said assemblies and connections for applying a control voltage across each of said phosphor layers, and conductive means connected to each of said pairs of layers of electrically conductive material for applying said voltages.

11. In a cathode-ray tube having an electron beam source, a screen comprising a plurality of ultraviolet excitable layers, each of said ultraviolet excitable layers being adapted for the production of light having one of a plurality of predetermined colors, a layer of electrically conductive material placed between each of the respective pairs of said ultraviolet excitable layers, a layer of ultraviolet emissive material positioned between said electron beam source and the plurality of ultraviolet excitable layers, said layer of ultraviolet emissive material being excitable by the electron beam from said electron beam source, and a filter member being positioned between the layer of ultraviolet emissive material and the plurality of ultraviolet excitable layers.

12. The apparatus of claim 11, characterized by said filter being substantially transparent to ultraviolet radiations and substantially opaque to electrons of the electron beam from said electron beam source.

References Cited in the file of this patent

UNITED STATES PATENTS

| | | |
|---|---|---|
| 2,239,887 | Ferrant | Apr. 29, 1941 |
| 2,442,961 | Ramberg | June 8, 1948 |
| 2,461,515 | Bronwell | Feb. 15, 1949 |
| 2,470,449 | Williams | May 17, 1949 |
| 2,476,619 | Nicoll | July 19, 1949 |
| 2,566,713 | Zworykin | Sept. 4, 1951 |
| 2,580,073 | Burton | Dec. 25, 1951 |
| 2,590,764 | Forgue | Mar. 25, 1952 |
| 2,704,783 | Sziklai | Mar. 22, 1955 |
| 2,730,644 | Michlin | Jan. 10, 1956 |

FOREIGN PATENTS

| | | |
|---|---|---|
| 474,907 | Great Britain | Nov. 9, 1937 |
| 598,545 | Great Britain | Feb. 20, 1948 |